United States Patent
Raz

(10) Patent No.: US 9,239,805 B2
(45) Date of Patent: Jan. 19, 2016

(54) DRIVERLESS DATA TRANSFER DEVICE

(71) Applicant: R.F KEEPER LTD, Rosh Ha'ain (IL)

(72) Inventor: Shimi Raz, Bat Hefer (IL)

(73) Assignee: R.F KEEPER LTD, Rosh Ha'ain (IL)

( * ) Notice: Subject to any disclaimer, the term of this patent is extended or adjusted under 35 U.S.C. 154(b) by 0 days.

(21) Appl. No.: 14/347,365

(22) PCT Filed: Sep. 23, 2012

(86) PCT No.: PCT/IL2012/000347
§ 371 (c)(1),
(2) Date: Mar. 26, 2014

(87) PCT Pub. No.: WO2013/046198
PCT Pub. Date: Apr. 4, 2013

(65) Prior Publication Data
US 2014/0330993 A1    Nov. 6, 2014

Related U.S. Application Data

(60) Provisional application No. 61/539,489, filed on Sep. 27, 2011.

(51) Int. Cl.
G06F 13/10 (2006.01)
H04L 29/08 (2006.01)
G07G 3/00 (2006.01)

(52) U.S. Cl.
CPC ............. *G06F 13/102* (2013.01); *G07G 3/003* (2013.01); *H04L 67/06* (2013.01)

(58) Field of Classification Search
CPC ... G06F 3/0689; G06F 3/0613; G06F 3/0659; G06F 3/0607; G06F 13/385
USPC .......................................................... 710/62
See application file for complete search history.

(56) References Cited

U.S. PATENT DOCUMENTS

| | | | |
|---|---|---|---|
| 5,640,002 A | 6/1997 | Ruppert et al. | |
| 7,904,622 B2 | 3/2011 | Paulos et al. | |
| 7,974,577 B2 | 7/2011 | Stephens | |
| 8,024,493 B2 | 9/2011 | Matzuzzi | |
| 2003/0046451 A1 | 3/2003 | Prabhakaran | |
| 2004/0102870 A1* | 5/2004 | Andersen et al. | 700/215 |
| 2004/0176032 A1* | 9/2004 | Kotola et al. | 455/41.2 |
| 2005/0033880 A1* | 2/2005 | Lin | 710/52 |
| 2007/0019110 A1* | 1/2007 | Cho | 348/554 |
| 2007/0192525 A1* | 8/2007 | Chang et al. | 710/306 |
| 2009/0052344 A1* | 2/2009 | Fujii | 370/254 |

OTHER PUBLICATIONS

International Search Report and Written Opinion dated Feb. 21, 2013 in corresponding International Application No. PCT/IL2012/000347.

* cited by examiner

*Primary Examiner* — Farley Abad

(57) ABSTRACT

The present invention includes a driverless data transfer device and method for accessing and downloading item data from an item storage unit associated with an item. The driverless data transfer device includes, inter alia, a data downloading unit configured to download the item data, an interface unit for transferring the downloaded data to an item checking unit via a communications bus, and a decoder configured to decode said stored data to conform to data processing requirements of the item checking unit.

12 Claims, 4 Drawing Sheets

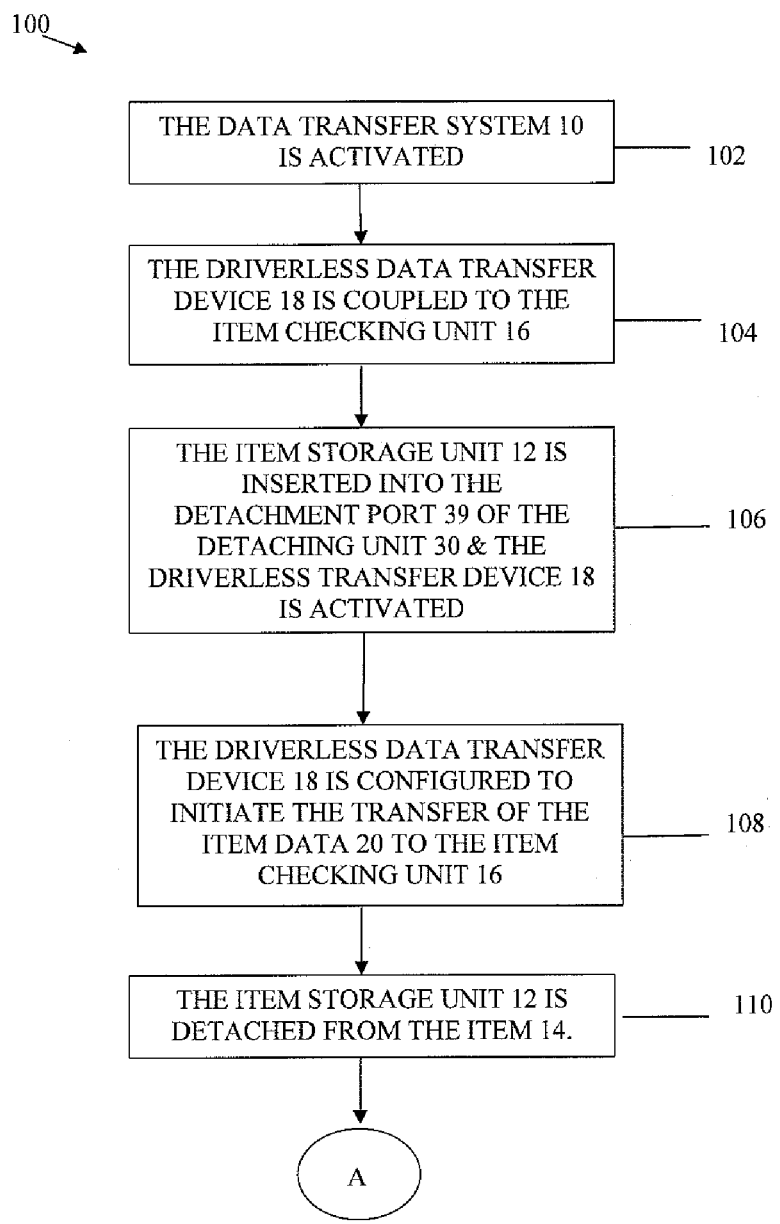
FIG. 3/1

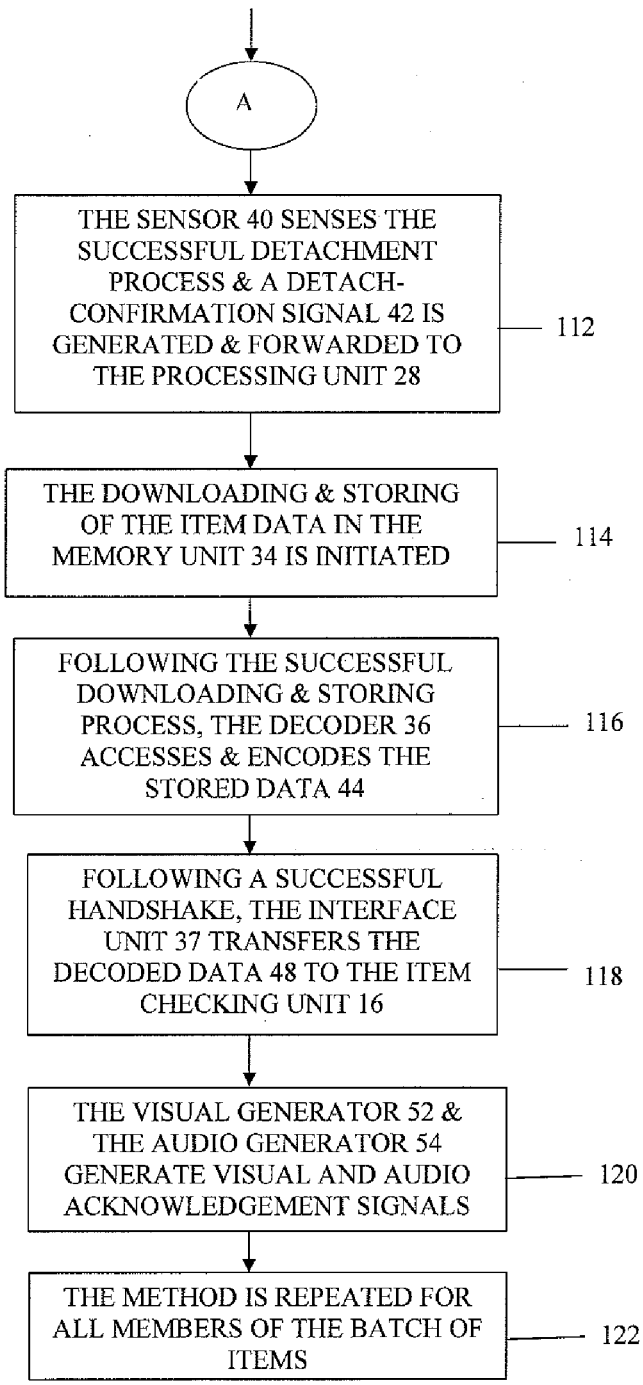
FIG. 3/2

DRIVERLESS DATA TRANSFER DEVICE

FIELD OF THE INVENTION

This invention relates to a data transfer system for accessing and checking item data stored in an item by means of a driverless data transfer device.

BACKGROUND OF THE INVENTION

The following prior art is believed to be the current status of the art:

U.S. Published Patent Application No. 2011/00104470 A1 describes a USB device for connecting to a host computer and allowing a user thereof to connect to a manufacturer's website for obtaining details of a product of sale.

WO 2004/093149 describes a USB device including a memory for storing an autorun functionality. The USB devices is interrogated by a host computer and following a successful handshake between the USB and the computer, the autorun firmware on the USB informs the host computer of the presence of an autorun executable file and provides the host with the file. The host executes the autorun executable file to provide the autorun functionality.

U.S. Pat. No. 6,385,677 describes a dual interface memory card with a memory unit and a micro-control unit connected to the memory unit. The micro-control unit includes: a USB interface for connecting to a computer whereby the computer is able to read data from and write data to the memory unit, and a host interface for connecting to an electronic product which has the memory card installed therein such that data output from the electronic product can be stored in the memory unit.

WO2005/043588 describes a portable electronic device may be configured to present information identifying a coupon or rebate offer concerning a product or service in a machine-readable format at a point of sale.

Thus, there is an unmet requirement for a data transfer system for accessing and checking item data stored in an item storage unit associated with an item by means of a driverless data transfer device.

SUMMARY OF THE INVENTION

This invention seeks to provide a driverless data transfer system for accessing and checking item data stored in an item by means of a driverless data transfer device.

Storing item data in an item storage unit, such as an RF Identification (RFID) tag is known in the art. A customer who wishes to purchase an item in a supply store, such as a clothes store, selects the desired item and proceeds with the item to cash register or a point-of-sales device for purchasing the item. In order to check the details, the sales assistant places or inserts the RFID tag into an RFID tag detaching device. The item data is communicated to the cash register or points-of-sales register. Subsequently, the sale and purchase of the item or article proceeds accordingly.

In order to be able to access the various item or article data stored in the RFID tag, it is required that the cash register or points-of-sales device includes the relevant hardware and software. In addition, each sales point device requires updating with the required and relevant hardware and software for proceeding with the sales of the item or article. These hardware or software are included in the sales points' devices by introducing a relevant driver into the sales point device in order to enable the sales assistant access to the item data stored in the RFID tag. This is time consuming and expensive and requires special personnel to install the required hardware and software and check the running thereof.

The present invention relates to a driverless data transfer device which does not require the installation of any relevant hardware and software in the cash register or point-of-sales device. The present invention is driverless and enables the sales assistant to proceed with the sale of the item or article quickly and easily. The present invention includes an decoder unit which decodes the item data to be compatible with the requirements of the sales device and does not require the installation of a driver in the sales device for accessing and reading the item data stored in the item storage unit.

The driverless data transfer device of the present invention communicates the item data to the sales device via a communications bus without the installation of any additional hardware and software for reading the item data stored in the item storage unit, such as the RFID tag.

Thus, the present invention is a universal driverless data device is typically useful, for example, with a cash register or with a point-of-sales device.

There is provided in accordance with a preferred embodiment of the present invention a driverless data transfer device including a data downloading unit configured to download item data associated with an item data storage unit, an interface unit coupling the driverless data transfer device to a communications port of an item checking unit, a memory unit for storing the downloaded item data, and a decoder configured to decode the stored data to conform to data processing requirements of the item checking unit. Following a successful handshake between the driverless data transfer device and the item checking unit, the data downloading unit accesses and downloads the item data from the item storage unit and stores the downloaded data in the memory unit. and The decoded data is transferred to the item checking unit.

There is further provided in accordance with a preferred embodiment of the present invention a method for transferring data by a driverless data transfer device including providing a data downloading unit configured to download item data associated with an item data storage unit, providing an interface unit coupling the driverless data transfer device to a communications port of an item checking unit, providing a memory unit for storing the downloaded item data, and providing a decoder configured to decode the stored data to conform to data processing requirements of the item checking unit. Following a successful handshake between the driverless data transfer device and the item checking unit, the data downloading unit accesses and downloads the item data from the item storage unit and stores the downloaded data in the memory unit.

Further in accordance with a preferred embodiment of the present invention, the driverless data transfer device further includes a processing unit configured to instruct the data downloading unit to initiate downloading of the item data from the item to the memory unit.

Still further in accordance with a preferred embodiment of the present invention the processing unit is further configured to instruct the decoder to access the stored downloaded data, decode the downloaded data and forward the decoded data to the interface unit for transferring to the item checking unit.

Additionally in accordance with a preferred embodiment of the present invention a visual signal generator and a display unit for visually acknowledging the transfer of the downloaded item data to the item checking unit.

Moreover in accordance with a preferred embodiment of the present invention further including an audio generator and a loudspeaker for audibly acknowledging the transfer of the downloaded data to the item checking unit.

Further in accordance with a preferred embodiment of the present invention including a detaching device for inserting the item storage unit therein enabling mechanically detaching the item storage unit from the item.

Still further in accordance with a preferred embodiment of the present invention further including a detaching device enabling magnetically detaching the item storage unit from the item.

Additionally further in accordance with a preferred embodiment of the present invention further including a detaching device enabling magnetically detaching the item storage unit from the item.

Moreover further in accordance with a preferred embodiment of the present invention the detaching device includes a detaching signal generator for generating and forwarding a detach-confirmation signal to the processing unit following a successful detachment of the item storage unit from the item whereupon the processing unit instructs the downloading unit to initiate the downloading of the item data.

Further in accordance with a preferred embodiment of the present invention the detach-confirmation signal is selected from an EM signal, an audio signal, a mechanical signal and any combination thereof.

Still further in accordance with a preferred embodiment of the present invention the processing unit instructions include a communications signal the communications signal is selected from the group consisting of a wireless communications signal, a wire communications signal and any combination thereof.

Typically the wireless communications is an EM signal and/or an audio signal.

Typically, item storage unit is an RF identification tag or a passive RF identification tag.

Additionally in accordance with a preferred embodiment of the present invention the processing unit is further configured to operate the handshake.

Moreover in accordance with a preferred embodiment of the present invention the downloaded item data includes at least one of the following: a cost of an item, an item quality factor, an item identification code, a manufacturer's identification code, a barcode, a stock-keeping unit code, an RF code and an item sales promotion notification and/or any combination thereof.

Typically, the item checking unit is at least one of the following a cash register, a laptop computer, a computer, a person digital assistant and/or point-of-sales unit.

Typically the communications port is at least one of the following a USB port, a serial port and/or a RS 232 port.

There is provided in accordance with another preferred embodiment of the present invention a data transfer system including an item data storage unit associated with an item, and an item checking unit. The data transfer system further including a driverless data transfer device coupling the item data storage unit to the checking unit and the driverless data transfer device downloads item data from the item data storage unit and transfers the downloaded data to the item checking unit.

There is provided in accordance with yet another preferred embodiment of the present invention a method for transferring data from an item storage unit associated with an item checking unit including providing the item data storage unit and the item, providing the item checking unit and providing a driverless data transfer device. The driverless data transfer device including a data downloading unit, a memory unit for storing the downloaded data, a driverless data transfer device coupling the item data storage unit to the checking unit, and a processing unit for controlling data transfer within the driverless data transfer device, activating the driverless data transfer device, configuring the driverless data transfer device to initiate transfer of the item data from the item to the item checking unit.

Further in accordance with another preferred embodiment of the present invention the driverless data transfer device includes a data downloading unit configured to download the item data, an interface unit coupling the driverless data transfer device to a communications port of an item checking unit, a memory unit for storing the downloaded item data, and a decoder configured to decode the stored data to conform to data processing requirements of the item checking unit. Following a successful handshake between the driverless data transfer device and the item checking unit, the data downloading unit accesses and downloads the item data from the item storage unit and stores the downloaded data in the memory unit.

Further in accordance with another preferred embodiment of the present invention the driverless data transfer device further includes a processing unit configured to instruct the data downloading unit to initiate downloading of the item data from the item to the memory unit.

Still further in accordance with another preferred embodiment of the present invention the processing unit is further configured to instruct the decoder to access the stored downloaded data, decode the stored downloaded data and forward the decoded data to the interface unit for transferring to the item checking unit.

Additionally in accordance with another preferred embodiment of the present invention the driverless data transfer device further includes a visual signal generator and a display unit for visually acknowledging the transfer of the downloaded item data to the item checking unit.

Moreover in accordance with another preferred embodiment of the present invention the driverless data transfer device further includes an audio generator and a loudspeaker for audibly acknowledging the transfer of the downloaded data to the item checking unit.

Further in accordance with another preferred embodiment of the present invention the driverless data transfer device further includes a detaching device for inserting the item storage unit therein enabling mechanically detaching the item storage unit from the item.

Still further in accordance with another preferred embodiment of the present invention the driverless data transfer device further includes a detaching device for inserting the item storage unit therein enabling mechanically detaching the item storage unit from the item.

Additionally in accordance with another preferred embodiment of the present invention the driverless data transfer device further includes a detaching device enabling magnetically detaching the item storage unit from the item.

Further more in accordance with another preferred embodiment of the present invention the detaching device includes a detaching signal generator for generating and forwarding a detach-confirmation signal to the processing unit following a successful detachment of the item storage unit from the item whereupon the processing unit instructs the downloading unit to initiate the downloading of the item data.

Further in accordance with another preferred embodiment of the present invention the detach-confirmation signal is selected from an EM signal, an audio signal, a mechanical signal and any combination thereof.

Still further in accordance with another preferred embodiment of the present invention the processing unit instructions include a communications signal the communications signal is selected from the group consisting of a wireless communications signal, a wire communications signal and any combination thereof.

Typically, the wireless communications is an EM signal and/or an audio signal.

Typically, the item storage unit is an RF identification tag or a passive RF identification tag.

Additionally in accordance with another preferred embodiment of the present invention the processing unit is further configured to operate the handshake.

Moreover in accordance with a preferred embodiment of the present invention the downloaded item data includes at least one of the following: a cost of an item, an item quality factor, an item identification code, a manufacturer's identification code, a barcode, a stock-keeping unit code, an RF code and an item sales promotion notification and/or any combination thereof.

Typically, the item checking unit is at least one of the following a cash register, a laptop computer, a computer, a person digital assistant and/or point-of-sales unit.

Typically the communications port is at least one of the following a USB port, a serial port and/or a RS 232 port.

BRIEF DESCRIPTION OF THE DRAWINGS

A preferred embodiment of the current invention is described hereinbelow with reference to the following drawings:

FIG. 3 shows a flow chart of a procedure of the driverless data transfer unit downloading item data and transferring the item data to the item checking unit, in accordance with a preferred embodiment of the present invention.

DETAILED DESCRIPTION OF A PREFERRED EMBODIMENT OF THE PRESENT INVENTION

Figure 1:
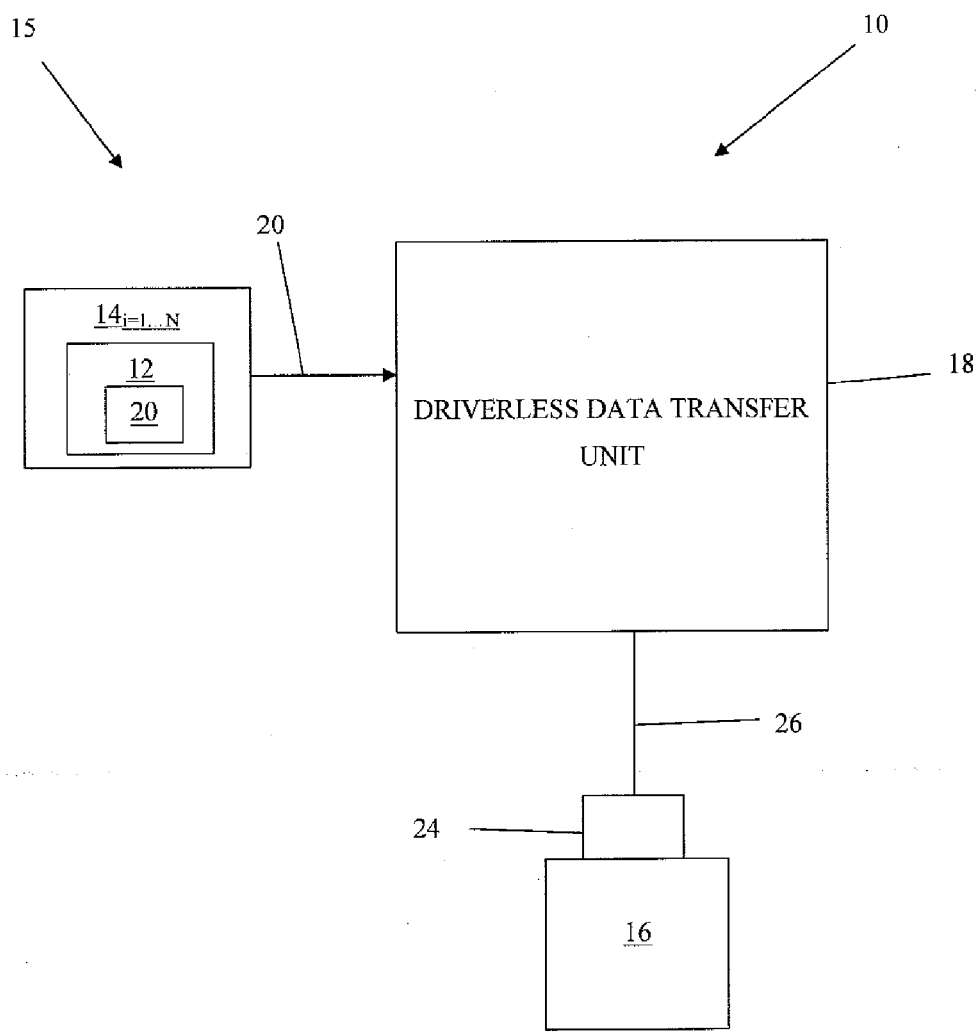
FIG. 1 shows a block diagram of a data transfer system, in accordance with a preferred embodiment of the present invention.

Reference is now made to FIG. 1, which shows a block diagram of a data transfer system 10, in accordance with a preferred embodiment of the present invention. The data transfer system 10 includes, inter alia, an item data storage unit 12 associated with an item $14_{i=1}$, where $1 \leq i \leq N$ and N is a total number of items in a batch of items 15, an item checking unit 16 and a driverless data transfer device 18 coupled between the item data storage unit 12 and the item checking unit 16. The item data storage unit 12 stores data regarding the item $14_{i=1}$ which is transferred to the checking unit 16 by the driverless data transfer unit 12.

The item data storage unit 12 includes, inter alia, data storage devices, such as a passive RF identification tag, which stores item data 20 therein. Typical item data 20 include, inter alia, item data such as, a cost of the item, an item quality factor, item identification data, manufacturer identification data, item barcode, item serial number, SKU (stock-keeping unit) number and the item sales promotion notification and any combination of these data.

The checking unit 16 receives the item data 20 from the item data storage unit 12 by means of the driverless data transfer device 18. The item checking unit 20 receives data 22 from the driverless data transfer device 18 and records, registers and checks the data 22 for customer use. For example, the checking unit 16 is typically a points-of-sale unit and the item checking unit 16 checks the data 22 with previously stored data 24 and provides a user of the data transfer system 10 with a purchase price and item details, such as item quality factor, item identification data, manufacturer identification data, item barcode, item serial number, SKU (stock-keeping unit) number and the item sales promotion notification and any combination of these data.

It is appreciated that the item checking unit 16 includes devices which are also able to record and check the item data 20, such as a cash register, a laptop computer, a computer and a person digital assistant.

In addition, the item checking unit 16 includes a communications port 24 for receiving the data 22 from the driverless data transfer device 18. The communications port 24 includes, inter alia, a USB port, a RS232 and a serial port.

Additionally or alternatively, the driverless data transfer device 18 is coupled to the driverless data transfer device 18.

Typically, the data transfer system 10 is employed for downloading the item 20 from at least one member from a batch of items 15. It is appreciated that the number of items in the batch of items 15 is case-dependent. The total number of items N is dependent on the storage and download capabilities of the driverless data transfer unit 18.

Figure 2:
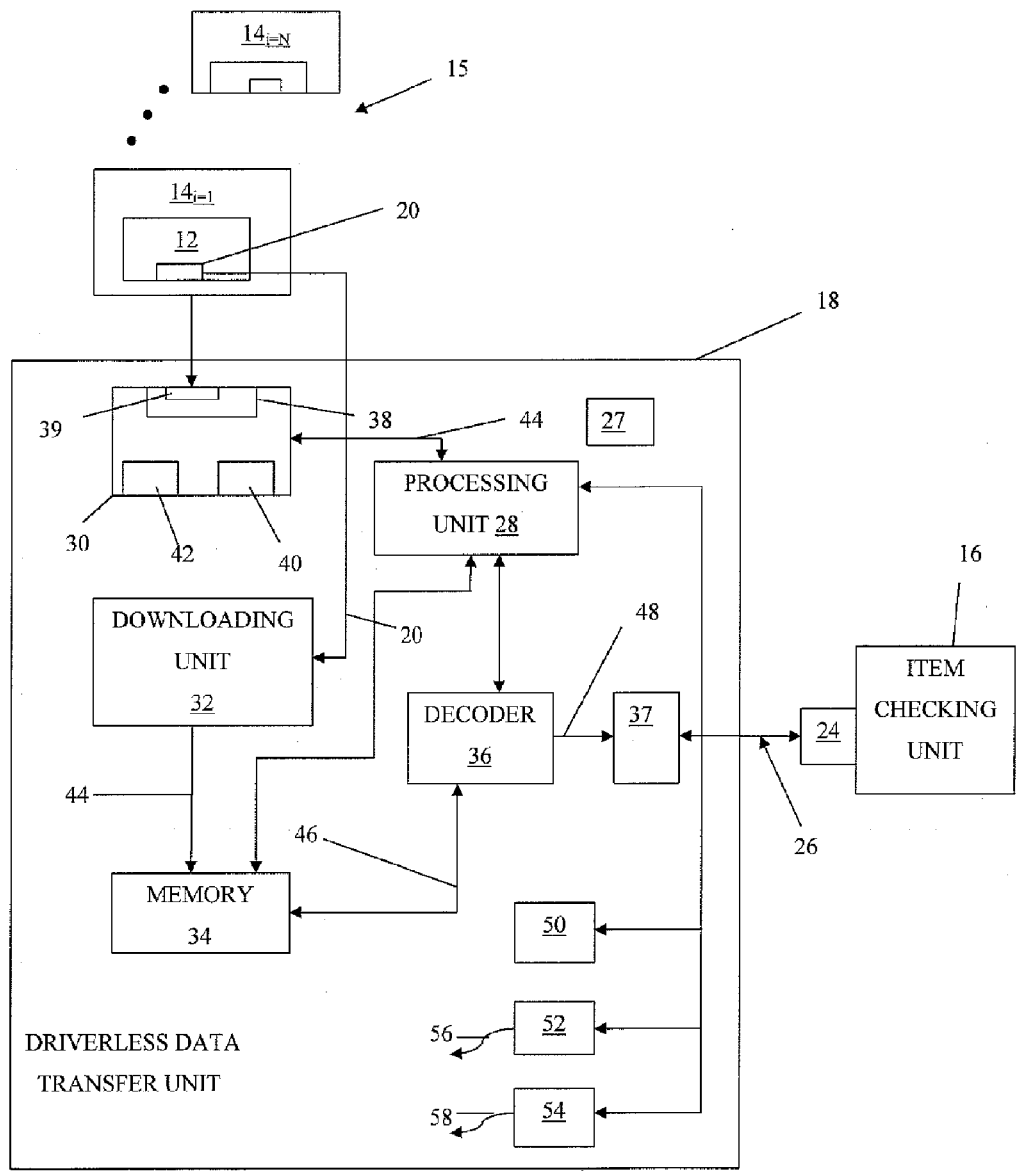
FIG. 2 shows a driverless data transfer device, in accordance with a preferred embodiment of the present invention.

Reference is now made to FIG. 2, which shows the driverless data transfer device 18, in accordance with a preferred embodiment of the present invention. FIG. 2 shows that the driverless data transfer device 18 is coupled by means of a communications bus 26 to the communications port 24 of the item checking unit 16. The driverless data transfer device 18 is configured to initiate the downloading and transferring of the item data 20 from the item storage unit 12 to the item checking unit 16. In accordance with a preferred embodiment of the present invention, the driverless data transfer device 18 transfers the downloaded item data 20 to the item checking unit 16 without the necessity and requirement that the item checking unit 16 includes requisite hardware and/or software for initiating and receiving the item data 20.

In accordance with the preferred embodiment of the present invention, the driverless data transfer device 16 operates without a device driver and driver software. The driverless data transfer device 18 interfaces with the item checking by means of the communications bus 26 and operates the transfer of the item data 20 to the item checking unit 16 without driver hardware and corresponding software.

Thus, the driverless data transfer device 18 is universally adaptable to devices by not including a device driver and the corresponding software.

The communications bus 26 includes data buses such as a USB communications data bus, and a serial communications bus.

The driverless data transfer device 18 preferably includes, inter alia, an activation switch 27, a processing unit 28, a detacher device 30, a download unit 32, a memory unit 34 and a decoder 36 and an interface unit 37.

The activation sensor switch 27 activates the driverless data transfer unit 18 and the processor unit 28 is configured to control the downloading and transferring the item data 20 to the item checking unit 16.

The detacher device 30 typically includes, inter alia, an item storage data detachment unit 38 for detaching the item data storage unit 12 from the item $14_{i=1}$. The storage detachment unit 38 includes a detachment port 39 for inserting the item storage unit 12 and mechanically detaching the item storage unit 12 from the item $14_{i=1}$, as is known in the art. The activation sensor switch 27 senses the insertion of item data storage unit 12 into the detachment port 39 and the activation sensor switch 27 is activates the driverless data transfer device 18.

Additionally or alternatively, the item storage data detachment unit 38 includes a detachment magnetic unit for magnetically detaching the item data storage unit 12 from the item $14_{i=1}$.

The detacher unit 30, also includes a second sensor 40 which senses the successful detachment of the item storage unit 12 from the item $14_{i=1}$ and a detach-confirmation signal generator 42. Following a successful detachment of the item storage unit 12 from the item $14_{i=1}$, the detach-confirmation signal generator 42 generates a detach-confirmation signal 44 and forwards the detach-confirmation signal 44 to the processing unit 28. On receiving the detach-confirmation signal 44, following a successful detachment of the item storage unit 12 from the item the processing unit 28 instructs the downloading unit 30 to initiate the downloading of the item data 20.

Additionally or alternatively, the detacher unit 28 includes a magnetic data reader which downloads the item data 20 from the item storage unit 12 magnetically.

It is appreciated that the detach-confirmation signal 44 includes, inter alia, a wirelessly EM communications signal or a wirely communications signal.

The data downloading unit 32 is configured to download the item data 20 from the item storage unit 12 and transfer downloaded data 46 from the item storage unit 12 to the memory unit 34, for storing therein.

A visual indicator unit 50 indicates the item data 20 downloading process by the data downloading unit 30.

On completion of downloading the item data 20, the processing unit 28, instructs the decoder 36 to access stored data 44. The decoder 36 decodes the stored data 44 into decoded data 48 and prepares the decoded data 48 for transferring to the item checking unit 16 by conforming the stored data 44 to data processing requirements of the item checking unit.

The interface unit 37 couples and interfaces the driverless data transfer device 18 to the item checking unit 16 by means of the communications bus 26. The interface unit 36 communicates with the communications port 24 of the item checking unit 16 and proceeds with a handshaking process with the item checking unit 16. Following a successful handshake with the item checking unit 16, the interface unit 37 accesses the decoded data 48 from the decoder 36 and transfers the decoded data 48 to the item checking unit via the communications bus 26 to the communications port 24 of the item checking unit 16.

Typical communications ports include a USB port, a serial port and a RS 232 port.

Additionally, the driverless data transfer device 18 includes, inter alia, a visual signal generator and display unit 50, for generating a visual acknowledgement signal 54 and an audio generator and loudspeaker unit 52, for generating an audio acknowledgement signal 56. For example, the visual generator and visual display unit 50 and the audio generator and loudspeaker unit 52 generate visual and audio acknowledgement signals 56 and 58, respectively, acknowledging the successful downloading of the item 20 and storing the data 46 in the memory unit 34 as well as generating the visual and audio acknowledgement signals 56 and 58 confirming the successful transfer of the item data 20 to the item checking unit 16.

Reference in now made to FIG. 3, which shows a flow chart of a procedure 100 of the driverless data transfer unit 18 downloading the item data 20 from the item storage unit $14_{i=1}$ and transferring the item data 20 to the item checking unit 16, in accordance with a preferred embodiment of the present invention.

In step 102, the data transfer system 10 is activated for transferring the item data 20 from the item data storage device 12 to the item checking unit 16.

In step 104, the driverless data transfer device 18 is coupled to the item checking unit 16 by means of the communications bus 26.

In step 106, the item storage unit 12 is inserted into the detachment port 39 of the detaching unit 30 and activation sensor switch 27 activates the driverless transfer device 18 for the data transfer process.

In step 108, the driverless data transfer device 18 is configured to initiate the transfer of the item data 20 to the item checking unit 16

In step 110, the item storage unit 12 is detached from the item $14_{i=1}$.

In step 112, the sensor 40 senses the successful detachment process and the detector-confirmation generator generates and forwards the detach-confirmation signal 42 to the processing unit 28.

In step 114, the processing unit 28 instructs the detaching unit 30 to initiate the downloading and storing of the item data in the memory unit 34.

In step 116, following the successful downloading and storing process, the processing unit 28 instructs the decoder 36 to access and decode the stored data 44.

In step 118, following a successful handshake between the driverless data transfer device 18 and the item checking unit 16, the interface unit 37 transfers the decoded data 48 to the item checking unit 16.

In step 120, the processing unit 28 instructs the visual generator 52 and the audio generator 54 to generate visual and audio download and transfer acknowledgement signals 56 and 58, respectively.

Following a successful transfer of the item data 20 to the item checking unit 16, the user of the system 10 inserts a further item storage unit $14_{i=1}$ into the port 39. In step 122, the process 100 is repeated until all the members of the batch 15 have been recorded and registered by the item checking unit 16.

The procedure 100 describes the process for downloading the item data 20 from a single item $14_{i=1}$. Typically, the user of the driverless data transfer device 20 checks a batch of items. The number N of items in the batch is case-dependent. For each member of the batch, the procedure 100 is to be repeated. On completion of checking of the N items in the batch, the user deactivates the driverless data transfer device.

In the foregoing description, embodiments of the invention, including preferred embodiments, have been presented for the purpose of illustration and description. They are not intended to be exhaustive or to limit the invention to the precise form disclosed. Obvious modifications or variations are possible in light of the above teachings. The embodiments were chosen and described to provide the best illustration of the principals of the invention and its practical application, and to enable one of ordinary skill in the art to utilize the invention in various embodiments and with various modifications as are suited to the particular use contemplated. All such modifications and variations are within the scope of the invention as determined by the appended claims when interpreted in accordance with the breadth they are fairly, legally, and equitably entitled.

The invention claimed is:

1. A driverless data device for transferring data associated with an item and stored in a data storage unit to an item checking unit; said device comprising:
   a. a data downloading unit configured to download said data associated with said data storage unit;
   b. an interface unit coupling said driverless data device to a communications port of an item checking unit; and
   c. a memory unit for storing said downloaded data attached to said item, and
   d. a decoder configured to decode said stored data to conform to data processing requirements of said item checking unit;
   said data from said storage unit is downloadable and storable in said memory unit following a successful detachment said data storage unit from said item;
   wherein a detaching device for inserting said storage unit therein enabling mechanically detaching said storage unit from said item; said detaching device comprises a detaching signal generator for generating and forwarding a detach confirmation signal to said processing unit following a successful detachment of said storage unit from said item whereupon said processing unit instructs said downloading unit to initiate said downloading of said data.

2. The driverless data device according to claim 1, wherein at least one of the following is true:
   a. said driverless data device comprises a processing unit configured to instruct said data downloading unit to initiate downloading of said data from said item checking unit to said memory unit;
   b. said driverless data device comprises a visual signal generator and a display unit for visually acknowledging said transfer of said downloaded data to said item checking unit;
   c. said driverless data device comprises an audio generator and a loudspeaker for audibly acknowledging said transfer of said downloaded data to said item checking unit;
   d.;
   e. said detaching device enables magnetically detaching said storage unit from said item;
   f. said storage unit is an RF identification tag;
   g. said processing unit is further configured to operate said handshake;
   h. said downloaded data comprises at least one of the following: a cost of an item, an item quality factor, an item identification code, a manufacturer's identification code, a barcode, a stock-keeping unit code, an RF code and an item sales promotion notification and any combination thereof;
   i. said item checking unit is selected from the group consisting of a cash register, a laptop computer, a computer, a person digital assistant, point-of-sales unit and any combination thereof;
   j. said communications port is selected from the group consisting of further comprising a USB port, a serial port and a RS 232 port; and
   k. said processing unit instructions comprise a communications signal said communications signal is selected from the group consisting of a wireless communications signal, a wire communications signal and any combination thereof.

3. The driverless data device according to claim 2, wherein said processing unit is further configured to instruct said decoder to access said stored downloaded data, decode said downloaded data and forward said decoded data to said interface unit for transferring to said item checking unit.

4. The driverless data device according to claim 2, wherein said RF identification tag is a passive RF identification tag.

5. The driverless device according to claim 1, wherein said detach confirmation signal is selected from an EM signal, an audio signal, a mechanical signal and any combination thereof.

6. The driverless data device according to claim 5, wherein said wireless communications is performed by means of a signal selected from the group consisting of an electromagnetic signal, an acoustic signal and any combination thereof.

7. A data transfer system comprising:
   a. an data storage unit associated with an item, and
   b. an item checking unit,
   c. a driverless data device coupling said data storage unit to said checking unit, said device comprising:
      i. a data downloading unit configured to download said data associated with said data storage unit;
      ii. an interface unit coupling said driverless data device to a communications port of an item checking unit; and
      iii. a memory unit for storing said downloaded data; and
      iv. a decoder configured to decode said stored data to conform to data processing requirements of said item checking unit;
   said driverless data device accesses and downloads said data from said data storage unit and transfers said downloaded data to said item checking unit following a successful detachment from said item;
   wherein a detaching device for inserting said storage unit therein enabling mechanically detaching said storage unit from said item; said detaching device comprises a detaching signal generator for generating and forwarding a detach confirmation signal to said processing unit following a successful detachment of said storage unit from said item whereupon said processing unit instructs said downloading unit to initiate said downloading of said data.

8. The data transfer system according to claim 7, wherein at least one of the following is true:
   a. said driverless data device further comprises a processing unit configured to instruct said data downloading unit to initiate downloading of said data from said item to said memory unit;
   b. said driverless data device further comprises a visual signal generator and a display unit for visually acknowledging said transfer of said downloaded data to said item checking unit;
   c. said driverless data device further comprises an audio generator and a loudspeaker for audibly acknowledging said transfer of said downloaded data to said item checking unit;
   e. said detaching device enables magnetically detaching said storage unit from said item;
   f. said processing unit instructions comprise a communications signal said communications signal is selected from the group consisting of a wireless communications signal, a wire communications signal and any combination thereof;
   g. said storage unit is an RF identification tag;
   h. said processing unit is further configured to operate said handshake;
   i. said downloaded data comprises at least one of the following: a cost of an item, an item quality factor, an item identification code, a manufacturer's identification code, a barcode, a stock-keeping unit code, an RF code and an item sales promotion notification and any combination thereof;

j. said item checking unit is selected from the group consisting of a cash register, a laptop computer, a computer, a person digital assistant, point-of-sales unit and any combination thereof; and k. said communications port is selected from the group consisting of further comprising a USB port, a serial port and a RS 232 port.

9. The data transfer system according to claim 8, wherein said processing unit is further configured to instruct said decoder to access said stored downloaded data, decode said stored downloaded data and forward said decoded data to said interface unit for transferring to said item checking unit.

10. The data transfer system according to claim 8, wherein said RF identification tag is a passive RF identification tag.

11. The data transfer system according to claim 7, wherein said detach-confirmation signal is selected from an EM signal, an audio signal, a mechanical signal and any combination thereof.

12. The data transfer system according to claim 11, wherein said detach-confirmation signal is selected from an EM signal, an audio signal, a mechanical signal and any combination thereof.

\* \* \* \* \*